(12) United States Patent
Welch et al.

(10) Patent No.: US 7,865,513 B2
(45) Date of Patent: Jan. 4, 2011

(54) DERIVATION OF RELATIONSHIPS BETWEEN DATA SETS USING STRUCTURED TAGS OR SCHEMAS

(75) Inventors: Peter Welch, Belmont, CA (US); William Charles Mortimore, Jr., San Francisco, CA (US)

(73) Assignee: Rearden Commerce, Inc., Foster City, CA (US)

( * ) Notice: Subject to any disclaimer, the term of this patent is extended or adjusted under 35 U.S.C. 154(b) by 639 days.

(21) Appl. No.: 11/479,434

(22) Filed: Jun. 30, 2006

(65) Prior Publication Data

US 2008/0005134 A1    Jan. 3, 2008

(51) Int. Cl.
G06F 7/00    (2006.01)
(52) U.S. Cl. .................................... 707/758
(58) Field of Classification Search .............. None
See application file for complete search history.

(56) References Cited

U.S. PATENT DOCUMENTS

| | | | |
|---|---|---|---|
| 5,608,900 | A | 3/1997 | Dockter et al. |
| 5,963,913 | A | 10/1999 | Henneuse et al. |
| 5,963,965 | A | 10/1999 | Vogel |
| 6,041,311 | A | 3/2000 | Chislenko et al. |
| 6,055,543 | A | 4/2000 | Christensen et al. |
| 6,199,099 | B1 | 3/2001 | Gershman et al. |
| 6,263,340 | B1 | 7/2001 | Green |
| 6,449,632 | B1 | 9/2002 | David et al. |
| 6,510,434 | B1 * | 1/2003 | Anderson et al. ........... 707/100 |
| 7,035,825 | B1 | 4/2006 | Sturtevant et al. |
| 7,152,058 | B2 | 12/2006 | Shotton et al. |
| 7,293,019 | B2 | 11/2007 | Dumais et al. |
| 7,299,193 | B2 | 11/2007 | Cragun et al. |
| 2001/0043210 | A1 * | 11/2001 | Gilbert et al. ............... 345/420 |
| 2002/0059339 | A1 | 5/2002 | McCormick et al. |
| 2002/0078045 | A1 * | 6/2002 | Dutta ........................... 707/7 |
| 2002/0116541 | A1 | 8/2002 | Parker et al. |
| 2006/0123017 | A1 | 6/2006 | Berg et al. |
| 2006/0167704 | A1 | 7/2006 | Nicholls et al. |
| 2006/0173985 | A1 | 8/2006 | Moore |
| 2006/0224969 | A1 | 10/2006 | Marston |
| 2006/0253567 | A1 | 11/2006 | Selin et al. |
| 2006/0288073 | A1 | 12/2006 | Bansod et al. |
| 2007/0067725 | A1 | 3/2007 | Cahill et al. |
| 2007/0073845 | A1 | 3/2007 | Reisman |
| 2007/0078832 | A1 | 4/2007 | Ott et al. |
| 2007/0233736 | A1 | 10/2007 | Xiong et al. |
| 2008/0005134 | A1 | 1/2008 | Welch |
| 2008/0005148 | A1 | 1/2008 | Welch |

(Continued)

OTHER PUBLICATIONS

Avoy, Kevin et al., U.S. Appl. No. 11/323,135, entitled "Method and System for Dynamic Event Adjustment", filed Dec. 29, 2005.

(Continued)

*Primary Examiner*—Pierre M Vital
*Assistant Examiner*—Truong V Vo
(74) *Attorney, Agent, or Firm*—Greenberg Traurig, LLP

(57) ABSTRACT

In one embodiment, a knowledge base is automatically built for enriching feeds coming from different sources and that have tags of different conventions, by deducting which tags go into various categories of knowledge. In one embodiment, method for a relationship between objects is determined based on the relationships between their tags.

18 Claims, 4 Drawing Sheets

U.S. PATENT DOCUMENTS

| | | |
|---|---|---|
| 2008/0040288 A1 | 2/2008 | Mortimore |
| 2008/0091828 A1 | 4/2008 | Mortimore |
| 2008/0092160 A1 | 4/2008 | Mortimore |

OTHER PUBLICATIONS

Transaction History of U.S. Appl. No. 11/323,135, filed Dec. 29, 2005, entitled "method and System for Dynamic Event Adjustment."

Transaction History of U.S. Appl. No. 11/478,799, filed Jun. 30, 2006, entitled "Automated Knowledge Base of Feed Tags."

Transaction History of U.S. Appl. No. 11/479,434, filed Jun. 30, 2006, entitled "Derivation of Relationships Between Data Sets Using Structured Tags or Schemes."

Transaction History of U.S. Appl. No. 11/484,134, filed Jul. 10, 2006, entitled "Method and System for Using RSS-Type Feeds in an E-Commerce Environment."

Transaction History of U.S. Appl. No. 11/549,950, filed Oct. 16, 2006, entitled "Method and System for Fine and Course-Grained Authorization of Personal Feed Contents."

Transation History of U.S. Appl. No. 11/690,028, filed Mar. 22, 2007, entitled "System and Method for View of Transactions and Events with Dynamic Updates."

Software Garden, Inc., "What is RSS: A tutorial introduction to feeds and aggregators," located at http://rss.softwaregarden.com/about.html, Jul. 6, 2004.

\* cited by examiner

DERIVATION OF RELATIONSHIPS BETWEEN DATA SETS USING STRUCTURED TAGS OR SCHEMAS

BACKGROUND

Data tags are becoming a standard convention for data from feeds. They appear on web sites, etc., and much of the tagging of data from such sites is actually being performed by users of the sites who end up "donating" the information while signing up for the tagging services. However, different sets from different sources (i.e., different web sites) may have different agreements or conventions about tag naming. When a person receives data feeds from a variety of sources, the different data sets may have a disparate variety of tags that do not identify the data types consistently.

What is clearly needed is a system and method that can help automatically build a knowledge base for enriching feeds coming from different sources and that have tags of different conventions, by deducting which tags go into various categories of knowledge.

As it is possible to associate tags, it may also be useful and interesting to know how the items to which the tags are attached are related to one another.

What is clearly further needed is a system and method for deducing the relationship between objects, based on the relationships between their tags.

SUMMARY OF THE DESCRIPTION

In one embodiment, a knowledge base is automatically built for enriching feeds coming from different sources and that have tags of different conventions, by deducting which tags go into various categories of knowledge. In one embodiment, method for a relationship between objects is determined based on the relationships between their tags.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
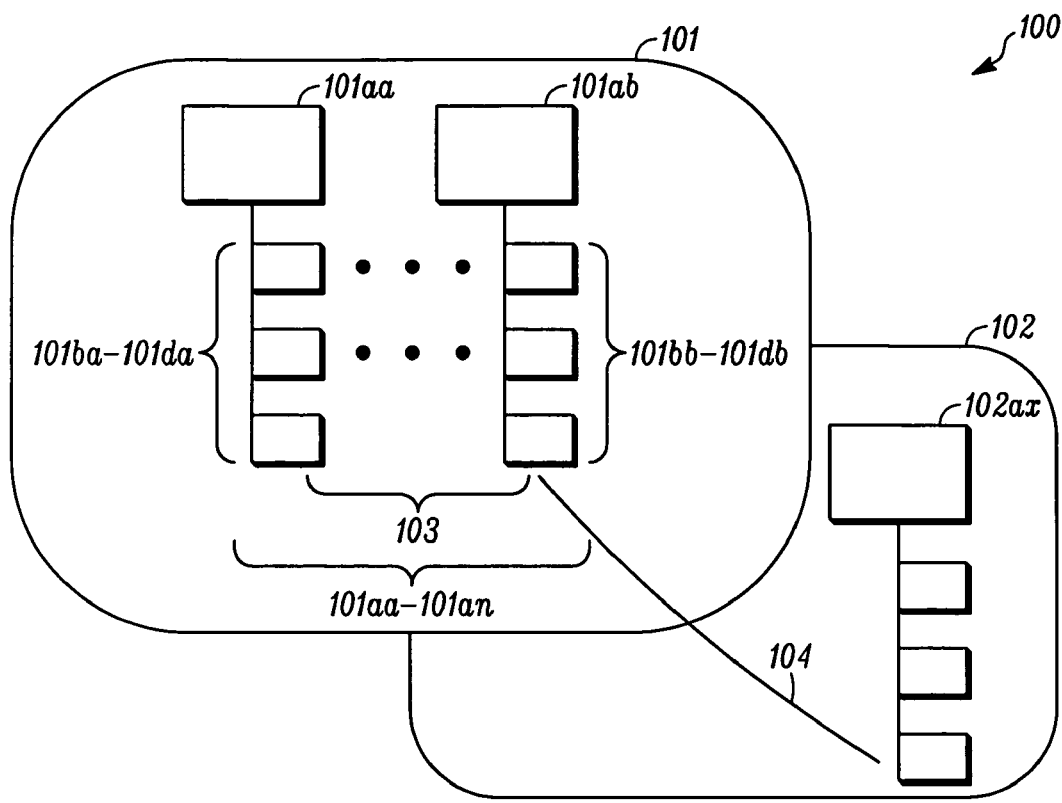
FIG. 1 shows an overview of several data sets.

FIG. 1 shows an overview 100 of several data sets. Data set 101 may contain data item 101aa, which is tagged 101ba-101da, and data item 101ab, which is tagged 101bb-101db. In this data set 101, data tags 101da and 101db are identical, as shown by connection line 103. Data set 102 may likewise contain data item 102ax, whose last data item also has a tag that matches the tag 101db, as shown by connection line 104. In this example, for purposes of simplicity and clarity, only two data items are shown in set 101 and only one data item in set 102; however, many more data items may exist in a typical data set.

Figure 2:
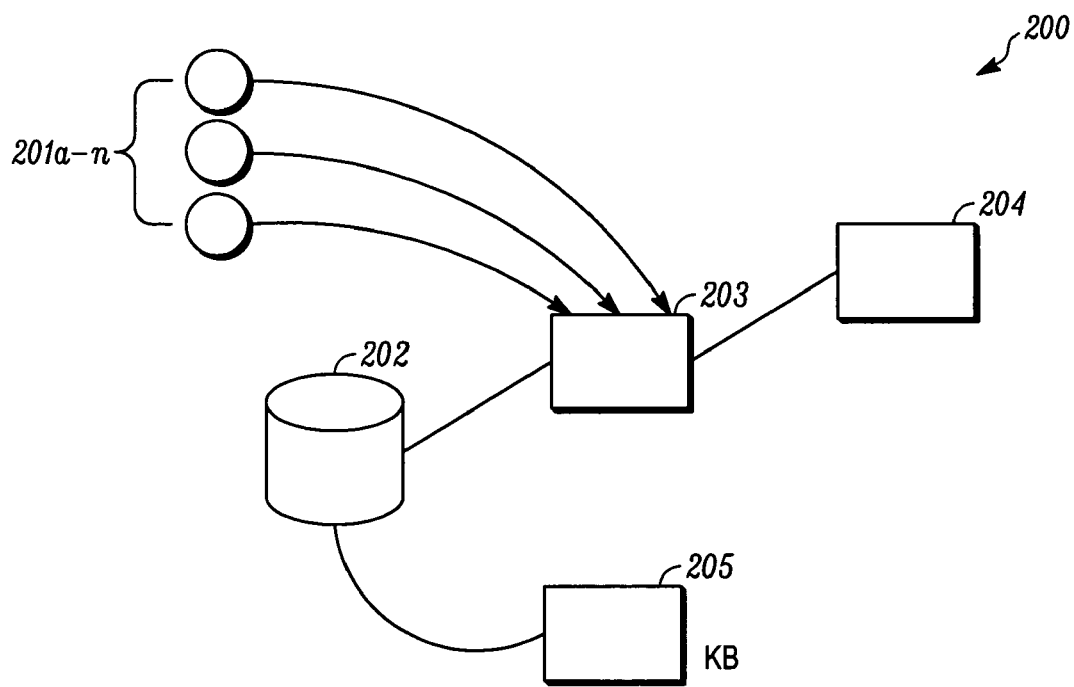
FIG. 2 shows an exemplary overview of a system according to one embodiment.

FIG. 2 shows an exemplary overview of a system 200 according to one embodiment. Feeds 201 a-n come in to server 203 with attached data tags (not shown). At server 203 the tags are filtered by software instance 204, which may use deduction engines (DE), or meta directories (MD), or in some cases extraction and transformation languages (ETL), or any useful combinations thereof to categorize and store said tags and feeds in database 202. At the same time, also in database 202 is a subset 205, which is the knowledge base created by the categorization of the different tags of different data sets (or feeds)

Figure 3:
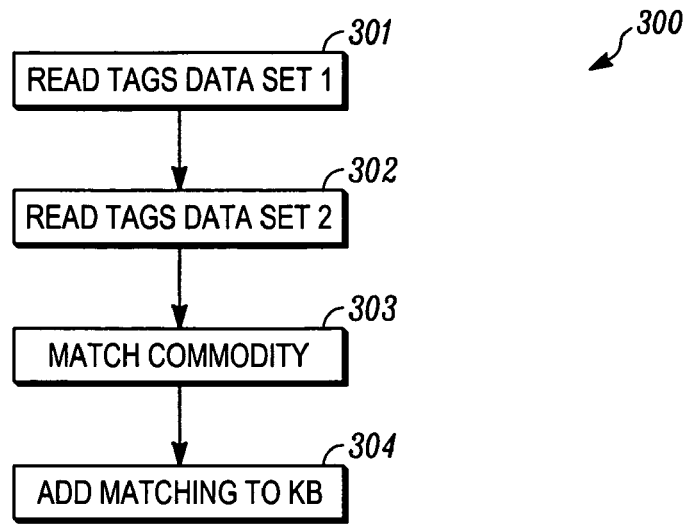
FIG. 3 shows an exemplary process for implementation of the system according to one embodiment.

FIG. 3 shows an exemplary process 300 for implementation of the system according to one embodiment. In process 301, the system reads the data tags of data set 1 (coming from a particular feed), and in process 302 the system reads the data tags of data set 2 (coming from an other feed). In process 303, the commonalities among the tags are matched. Unmatched tags may be sent to a human editor (not shown), or in some cases, there may be additional counting (not shown), for example, that lets the matching engines set up new categories. This could be done from existing datasets, such as vertically specific databases, thesauruses, alias tables, etc This matching may be accomplished by any or several of various means known in the art, such as, for example, by using a deductive engine, or a meta-directory, or an extraction-transformation approach (using DE, MD or ETL, alone or in combination). When the matches are confirmed, the matches are added in process 304 to knowledge base 205.

In some cases, it can be also useful for enriching data sources that don't have existing tags. For instance, tags from one data source could be applied to the same object from another data source. For example, if an object, for example "Yankees" (as in the sports team) is received from a data source which is rich in tag, those tags maybe used to enrich "Yankees" from another source which has no tags. Enriching one dataset with tags of another one allows merging with or grafting on the tag taxonomies, for example, etc.

Figure 4:
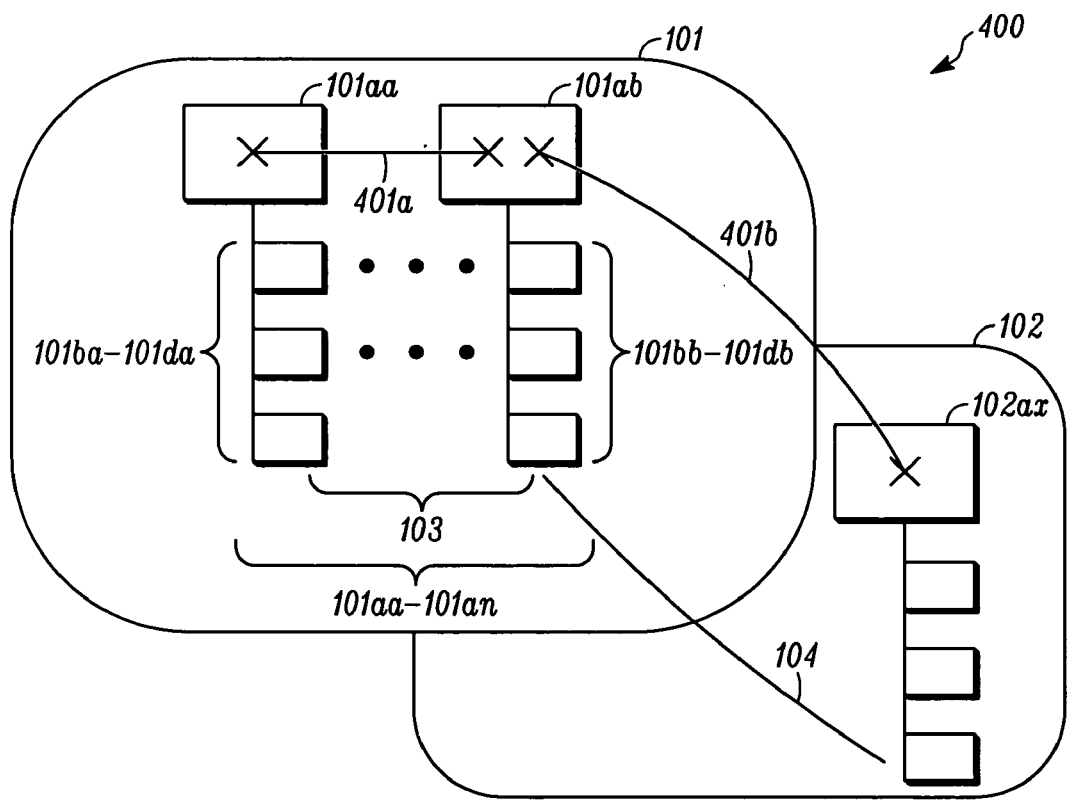
FIG. 4 shows an overview of multiple data objects.

FIG. 4 shows an overview 400 of data objects 101 and 102. This figure, however, also shows an additional relationship between data objects 101aa and 101ab, as shown by connection line 401a, the existence of which is deduced from the fact that the tags 101da and 101db have a relationship, as shown by connection line 103. The type of approach used for deduction of a data object relationship from one or more tag relationships may require the existence of more than one tag relationship. Alternatively, in an approach wherein different tags are assigned different weights and a certain weight level must be reached to infer a relationship, the deduction of a relationship between data objects may depend on the weights of the tags. Also shown is a relationship between data objects 101ab and 102ax, as shown by connection line 401b, likewise deduced from a relationship of their tags, as shown by connection line 104.

Figure 5:
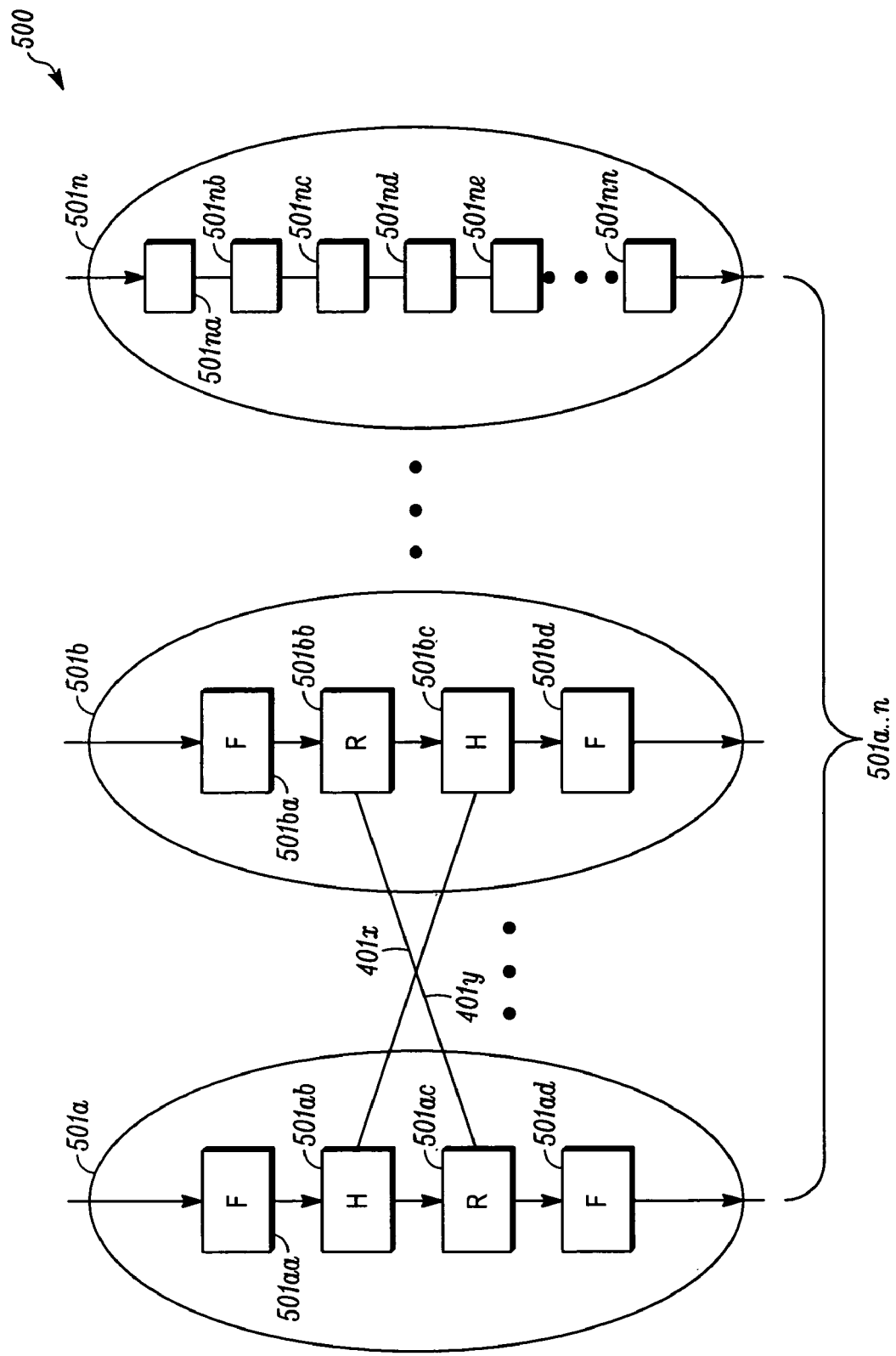
FIG. 5 shows an exemplary overview of a system according to one embodiment, which in this embodiment represents a travel schema.

FIG. 5 shows an exemplary overview of a system 500 according to the current one embodiment, which in this embodiment represents a travel schema. Each trip is represented by a set of data objects 501a, 501b, and so forth through 501n. Inside each trip set are the actual objects, such as flight F 501aa, hotel H 501ab, restaurant R 501ac, and another flight F 501ad. Likewise, set 501b, is a flight F 501ba, restaurant R501bb, hotel H 501bc, and another flight F 501bd. Based on tags that indicate, for example, their ZIP code or nearness to the airport, a relationship between hotels 501ab and 501bc is deduced, as shown by connection line 401y. Likewise, a relationship between the restaurants 501ac and 501bb is shown by connection line 401x, deduced from the fact the restaurants 501ac and 501bb are, in reality, the same restaurant. An analysis of the two links from a high level shows the close proximity of the connection points of those links (i.e., 501ab near 501ac and, similarly, 501bc near 501 bb). This analysis allows the system to deduct that the close proximity of those relationship end points in both data sets 401a and 401b indicate a close relationship, for example, between the restaurant (501ac, 501bb) and the hotel (501ab, 501bc). Therefore, a traveler may discover that it may be convenient to visit a certain restaurant (501 ac, 501 bb) when staying at a hotel (501ab, 501bc) nearby. It is clear that the deduction of these relationships is a very simplified example, but an example that shows how the system and method of one embodiment may be implemented.

Figure 6:
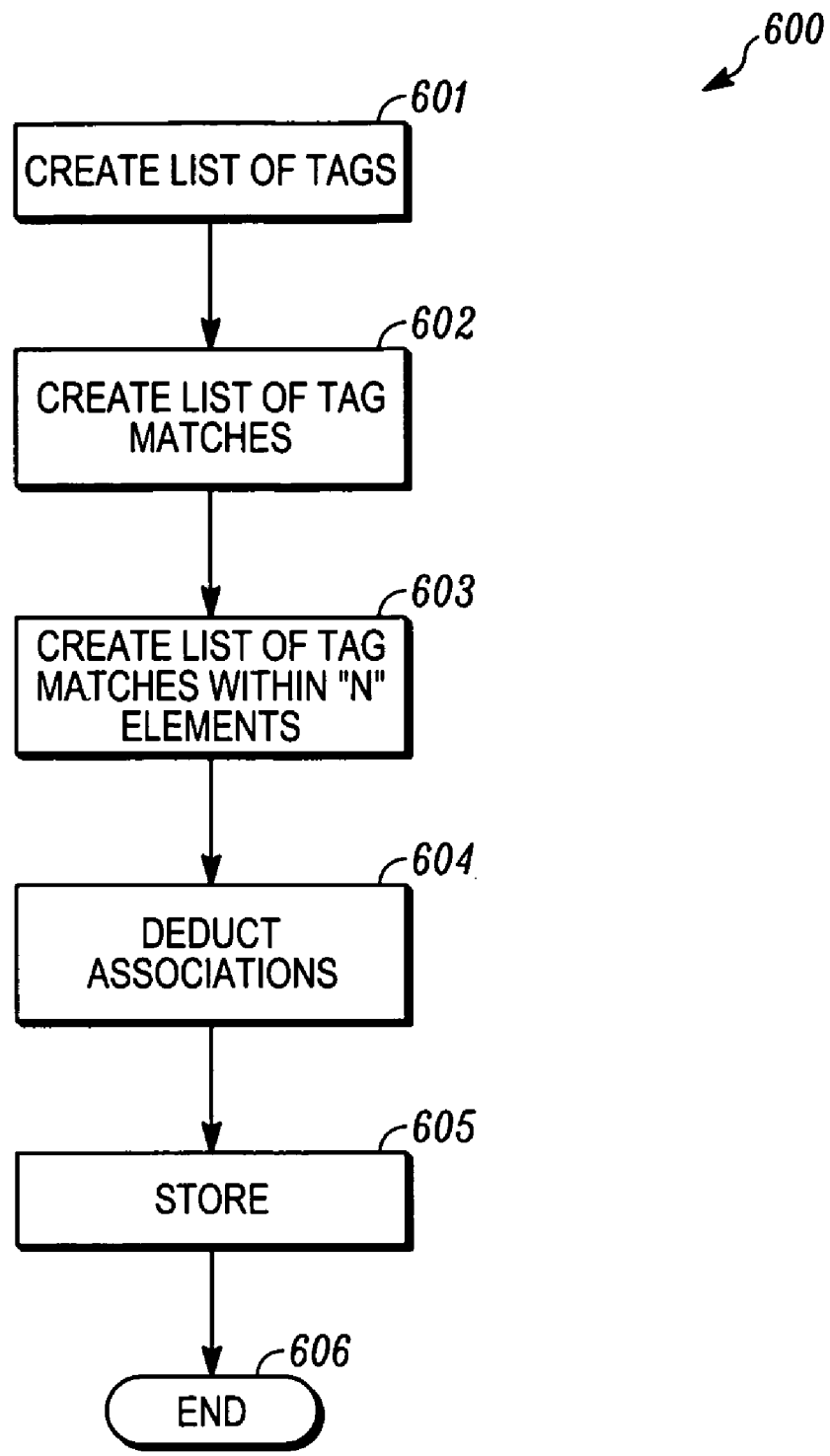
FIG. 6 shows an exemplary process for implementation of the system according to one embodiment.

FIG. 6 shows an exemplary process 600 for implementation of the system according to one embodiment. In process 601, the system creates a list of tags, and in process 602, the system creates a list of tag matches, i.e., relationships such as that shown by a connection line 401n (not shown). In process 603, the system examines the closeness of those tag relationships or matches and creates a short list wherein the matches are within n elements. As described above, the list could be created based on any one of various means, such as, for example, a threshold of a certain number of elements or the evaluation of a domain specific rule set depending on the application used. In process 604, the system deduces associations based on the short list of matches, and in process 605, the system stores these associations in a database (not shown). The process then ends in process 606. This exemplary process 600 may be used to create associations as just described, for example, between certain hotels and limousine services, between hotels and airports, between restaurants and hotels, and also between many and various services not related to the travel industry.

At least some embodiments, and the different structure and functional elements described herein, can be implemented using hardware, firmware, programs of instruction, or combinations of hardware, firmware, and programs of instructions.

In general, routines executed to implement the embodiments can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions can be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Some aspects can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's).

In various embodiments, hardwired circuitry can be used in combination with software instructions to implement the embodiments. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent can be reordered and other operations can be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications can be made thereto without departing from the broader spirit and scope of the invention as set forth in the following claims. The specification and drawings are, accordingly, to be regarded in an illustrative sense rather than a restrictive sense.

What is claimed is:

1. A computer-implemented method comprising:

reading, via a computing device, data tags of a first data object and a second data object of a first trip received from a first data feed of a first network connection;

reading, via the computing device, data tags of a first data object and a second data object of a second trip received from a second data feed of a second network connection;

creating, via the computing device, a first link between a first data tag of the first data object of the first trip with a first data tag of the second data object of the second trip, the first data object of the first trip and the second data object of the second trip representing a first type of service, wherein the first link indicates a relationship between the first data tag of the first data object of the first trip and the first data tag of the second data object of the second trip;

creating, via the computing device, a second link between a first data tag of the second data object of the first trip with a first data tag of the first data object of the second trip, the second data object of the first trip and the first data object of the second trip representing a second type of service, wherein the second link indicates a relationship between the first data tag of the second data object of the first trip and the first data tag of the first data object of the second trip;

deducing, via the computing device, an association between the first type of service and the second type of service if the first and second links are within a predetermined number of elements; and storing, via the computing device, the association between the first type of service and the second type of service on a database;

wherein one or more of the data tags have a weighted value, and the weighted values of the matching tags of the first and second data objects are equal to or greater than a predetermined value in order to determine a relationship between the data tags of the respective data objects; and wherein the first and second trips include data objects corresponding to one or more of a flight, a hotel, and a restaurant.

2. The method of claim 1, further comprising presenting the data objects from the first and second trips having a relationship between the data tags of the respective objects as matching data objects.

3. The method of claim 1, further comprising determining new categories from data tags that are unmatched based on datasets, the datasets including at least one from the group consisting of vertically specific databases, thesauruses, and alias tables.

4. The method of claim 1, further comprising matching data tags based on one from the group consisting of a deductive engine, a meta-directory, and a extraction-transformation approach.

5. The method of claim 1, further comprising applying the data tags of the first data object associated with the first data feed to a first data object associated with a third data feed, the first data object not having existing data tags.

6. The method of claim 5, wherein a name of the first data object associated with the first data feed is identical to a name of the first data object associated with a third data feed.

7. A non-transitory machine readable medium having stored thereon a set of instructions which when executed by a machine perform a method comprising:

reading, via a computing device, data tags of a first data object and a second data object of a first trip received from a first data feed of a first network connection;

reading data tags of a first data object and a second data object of a second trip received from a second data feed of a second network connection;

creating a first link between a first data tag of the first data object of the first trip with a first data tag of the second data object of the second trip, the first data object of the first trip and the second data object of the second trip representing a first type of service, wherein the first link indicates a relationship between the first data tag of the first data object of the first trip and the first data tag of the second data object of the second trip;

creating a second link between a first data tag of the second data object of the first trip with a first data tag of the first data object of the second trip, the second data object of the first trip and the first data object of the second trip representing a second type of service, wherein the second link indicates a relationship between the first data tag of the second data object of the first trip and the first data tag of the first data object of the second trip;

deducing an association between the first type of service and the second type of service if the links are within a predetermined number of elements;

storing the association between the first type of service and the second type of service on a database;

wherein one or more of the data tags have a weighted value, and the weighted values of the matching tags of the first and second data objects are equal to or greater than a predetermined value in order to determine a relationship between the data tags of the respective data objects; and wherein the first and second trips include data objects corresponding to one or more of a flight, a hotel, and a restaurant.

8. The non-transitory machine readable medium of claim 7, further comprising presenting the data objects from the first and second trips having a relationship between the data tags of the respective objects as matching data objects.

9. The machine readable medium of claim 7, further comprising determining new categories from data tags that are unmatched based on datasets, the datasets including at least one from the group consisting of vertically specific databases, thesauruses, and alias tables.

10. The machine readable medium of claim 7, further comprising matching data tags based on one from the group consisting of a deductive engine, a meta-directory, and a extraction-transformation approach.

11. The machine readable medium of claim 7, further comprising applying the data tags of the first data object associated with the first data feed to a first data object associated with a third data feed, the first data object not having existing data tags.

12. The machine readable medium of claim 11, wherein a name of the first data object associated with the first data feed is identical to a name of the first data object associated with the third data feed.

13. A computer system comprising:

at least one server for:

reading data tags of a first data object and a second data object of a first trip received from a first data feed of a first network connection;

reading data tags of a first data object and a second data object of a second trip received from a second data feed of a second network connection;

creating a first link between a first data tag of the first data object of the first trip with a first data tag of the second data object of the second trip, the first data object of the first trip and the second data object of the second trip representing a first type of service, wherein the first link indicates a relationship between the first data tag of the first data object of the first trip and the first data tag of the second data object of the second trip;

creating a second link between a first data tag of the second data object of the first trip with a first data tag of the first data object of the second trip, the second data object of the first trip and the first data object of the second trip representing a second type of service, wherein the second link indicates a relationship between the first data tag of the second data object of the first trip and the first data tag of the first data object of the second trip;

deducing an association between the first type of service and the second type of service if the links are within a predetermined number of elements;

storing the association between the first type of service and the second type of service on a database;

wherein one or more of the data tags have a weighted value, and the weighted values of the matching tags of the first and second data objects are equal to or greater than a predetermined value in order to determine a relationship between the data tags of the respective data objects; and wherein the first and second trips include data objects corresponding to one or more of a flight, a hotel, and a restaurant.

14. The system of claim 13, further comprising a means for presenting the data objects from the first and second trips having a relationship between the data tags of the respective objects as matching data objects.

15. The computer system of claim 13, further comprising determining new categories from data tags that are unmatched based on datasets, the datasets including at least one from the group consisting of vertically specific databases, thesauruses, and alias tables.

16. The computer system of claim 13, further comprising matching data tags based on one from the group consisting of a deductive engine, a meta-directory, and a extraction-transformation approach.

17. The computer system of claim 13, further comprising applying the data tags of the first data object associated with the first data feed to a first data object associated with a third data feed, the first data object not having existing data tags.

18. The computer system of claim 17, wherein a name of the first data object associated with the first data feed is identical to a name of the first data object associated with the third data feed.

* * * * *